United States Patent [19]
Pace et al.

[11] Patent Number: 6,126,201
[45] Date of Patent: *Oct. 3, 2000

[54] FOLDER FOR BINDING AND MAILING COMPACT DISCS

[75] Inventors: James Pace, Palos Hills; Frank J. Puisis, Hinsdale, both of Ill.

[73] Assignee: Inserts USA, Inc., Chicago, Ill.

[ * ] Notice: This patent is subject to a terminal disclaimer.

[21] Appl. No.: 09/003,582

[22] Filed: Jan. 6, 1998

Related U.S. Application Data

[63] Continuation of application No. 08/745,012, Nov. 7, 1996, Pat. No. 5,713,605.

[51] Int. Cl.⁷ ............................................. B42D 1/00
[52] U.S. Cl. ........................... 281/29; 281/38; 402/79; 206/308.1
[58] Field of Search .................. 402/79, 4, 80 R; 281/15.1, 21.1, 29, 38, 31, 45; 206/308.1, 307, 308.3, 312

[56] References Cited

U.S. PATENT DOCUMENTS

| | | |
|---|---|---|
| 2,345,230 | 3/1944 | Bender . |
| 4,508,366 | 4/1985 | Brindle . |
| 4,549,658 | 10/1985 | Sfikas . |
| 4,850,731 | 7/1989 | Youngs . |
| 4,852,740 | 8/1989 | Sellar et al. . |
| 5,048,681 | 9/1991 | Henkel . |
| 5,085,318 | 2/1992 | Leubrick . |
| 5,101,973 | 4/1992 | Martinez . |
| 5,154,284 | 10/1992 | Starkey . |
| 5,193,681 | 3/1993 | Livesay . |
| 5,290,118 | 3/1994 | Ozeki . |
| 5,422,875 | 6/1995 | Bribach . |
| 5,462,160 | 10/1995 | Youngs . |
| 5,501,326 | 3/1996 | Shusniang . |
| 5,501,540 | 3/1996 | Ho . |
| 5,590,912 | 1/1997 | Stevens . |
| 5,620,271 | 4/1997 | Bergh et al. . |
| 5,713,605 | 2/1998 | Pace et al. ............................ 402/79 X |

FOREIGN PATENT DOCUMENTS 8702565  10/1987  Netherlands .

OTHER PUBLICATIONS

American On–Line Pocket Style Disk Holder, 1996.
American On–Line Sleeve–Style CD–Rom Holder, 1997.

*Primary Examiner*—Willmon Fridie, Jr.
*Attorney, Agent, or Firm*—Vedder, Price, Kaufman & Kammholz

[57] ABSTRACT

A folder for holding a compact disc in a position for binding the folder into a magazine is made from a single web of cardstock. The web is folded into two equal portions along a central foldline to form two opposing front and rear panels of the folder. A circular section is cut out of the front panel to display the condition of a compact disc held in the folder. The two panels are glued together to capture the compact disc therebetween and a line of weakening is applied to the panels along one marginal edge thereof to define a combined binding and tear strip. This strip may be edge bound in a magazine and the line of weakening is spaced apart from the edge so that the folder may be separated from the magazine along the tear strip.

18 Claims, 6 Drawing Sheets

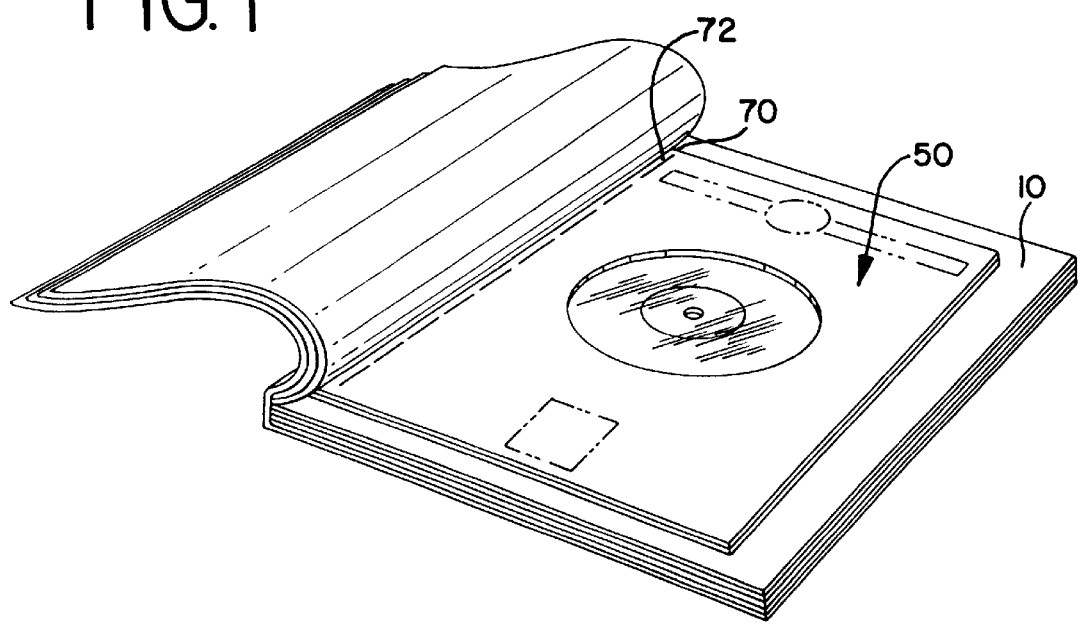
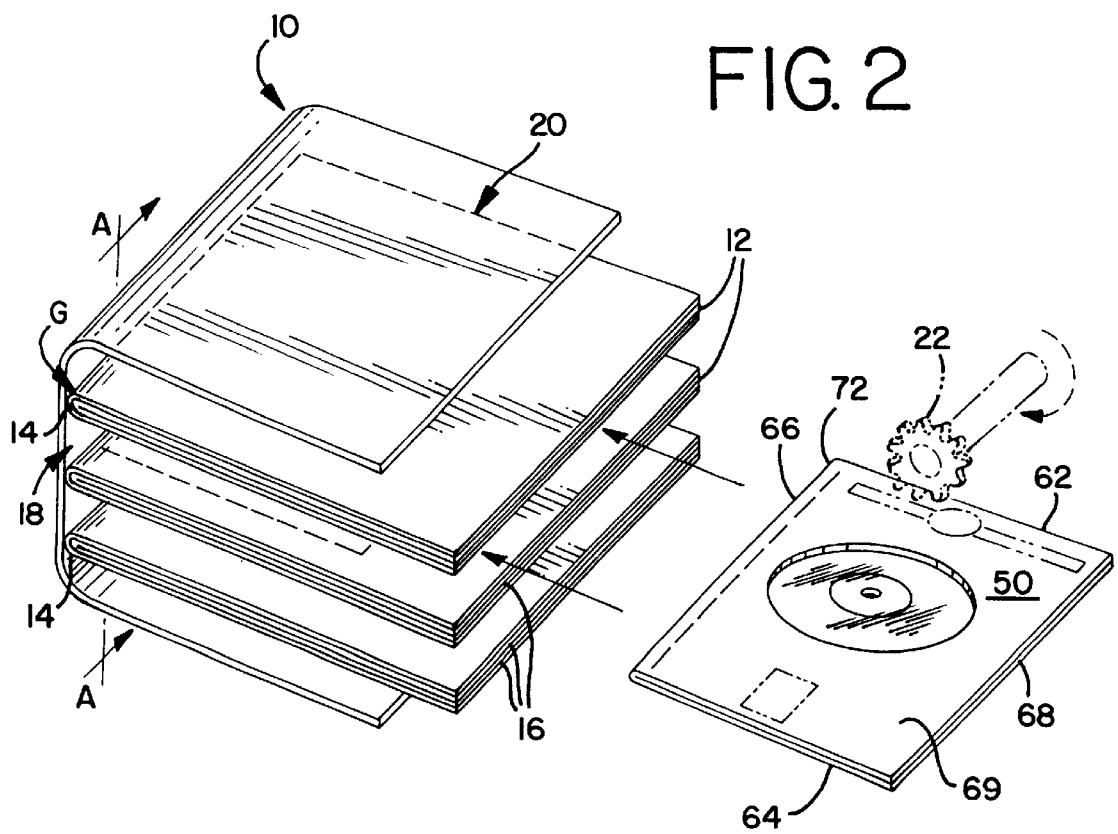

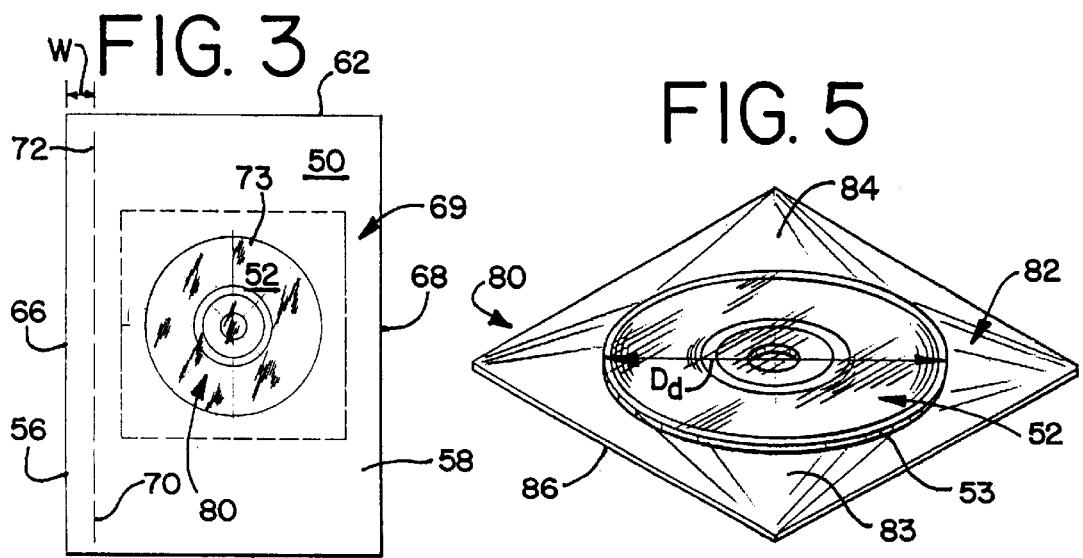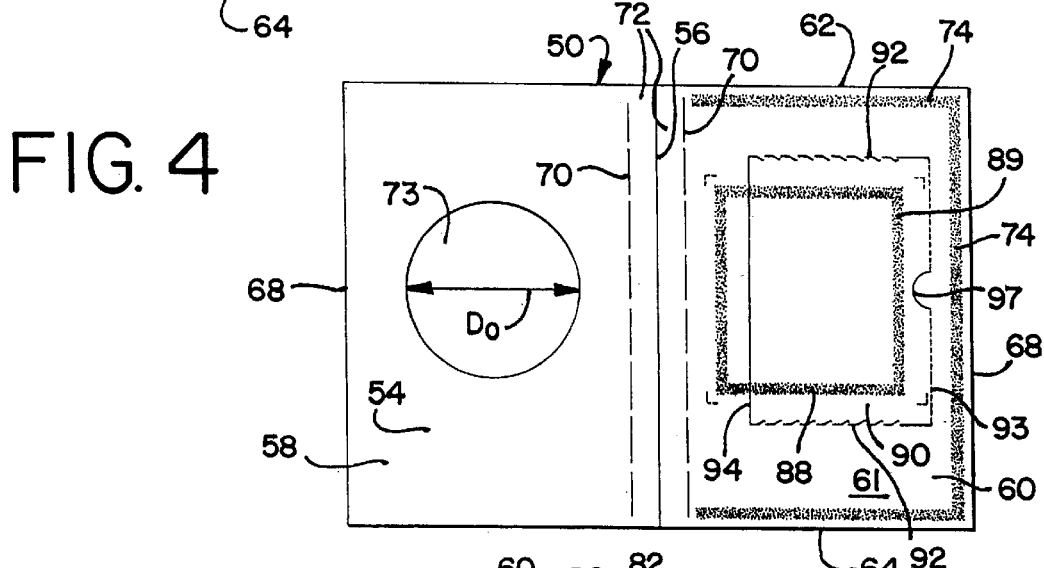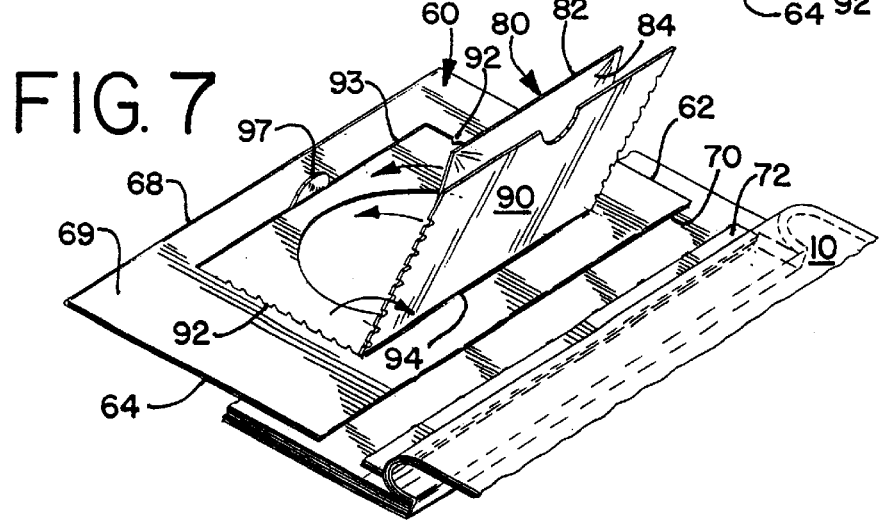

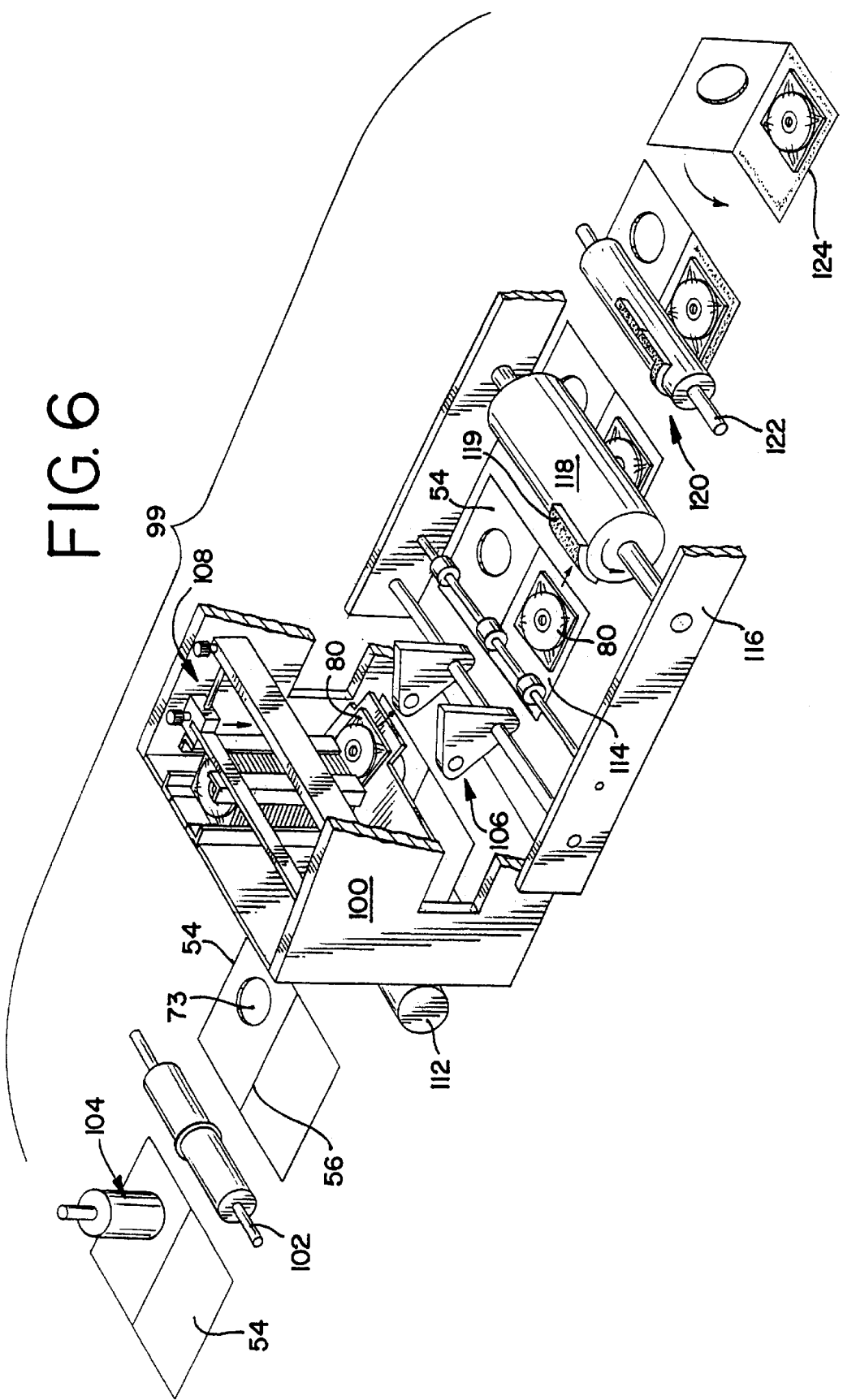

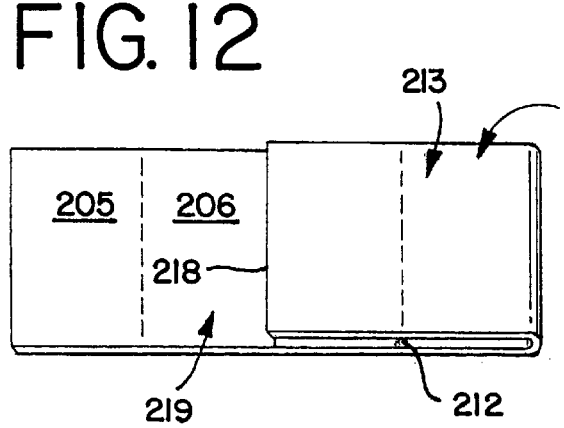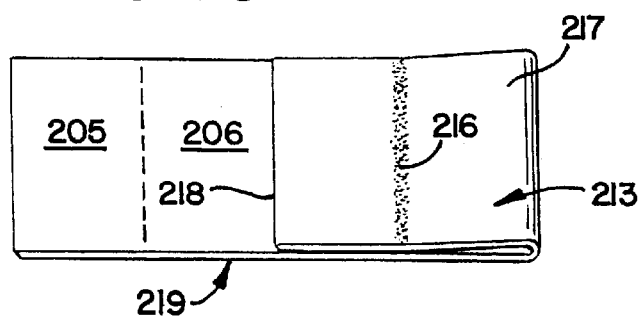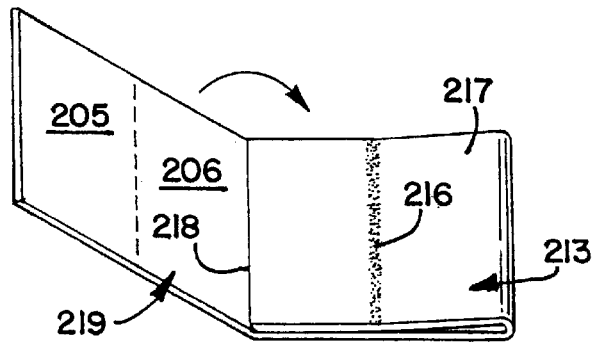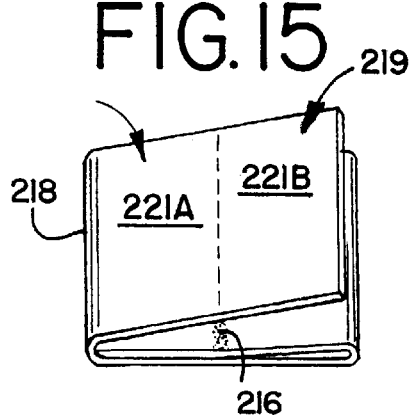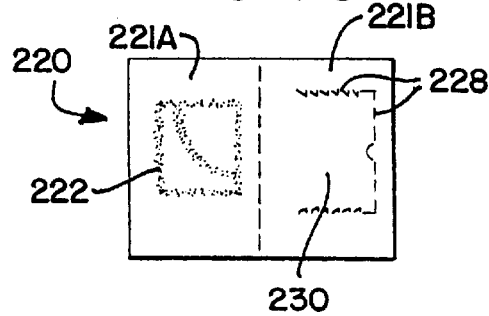

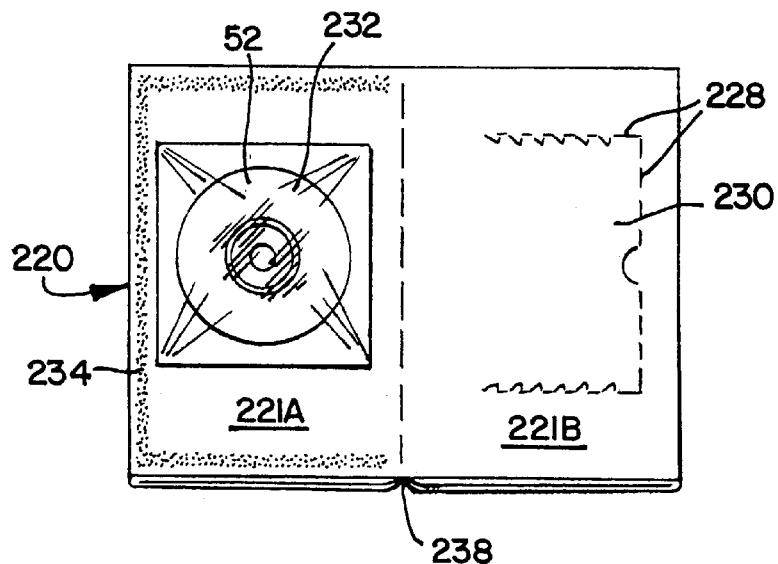
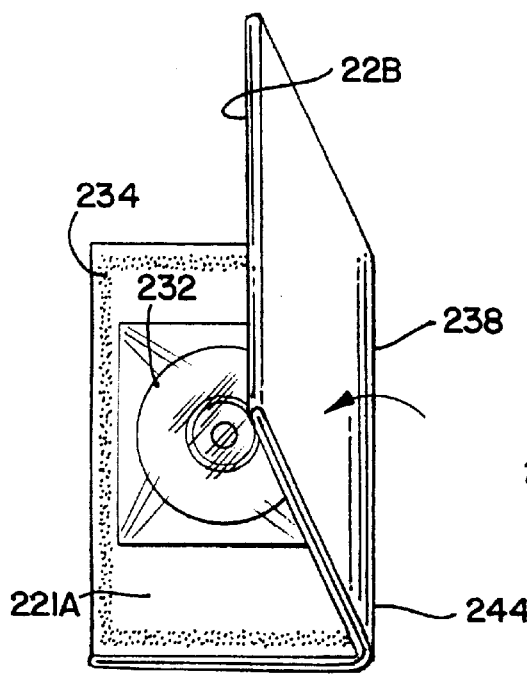
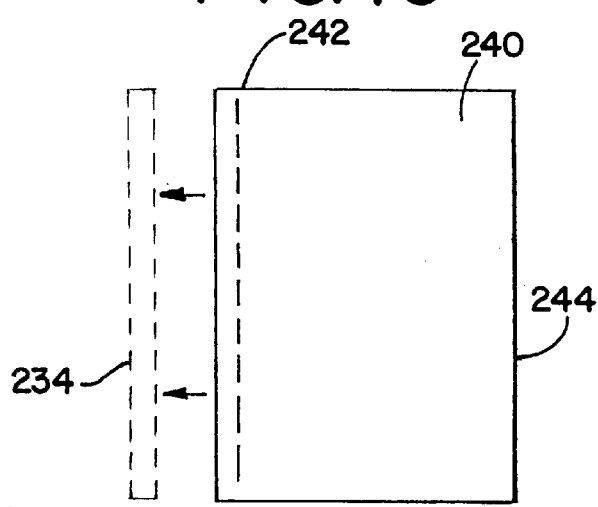

FOLDER FOR BINDING AND MAILING COMPACT DISCS

REFERENCE TO RELATED APPLICATIONS

This application is a continuation of prior application Ser. No. 08/745,012, filed Nov. 7, 1996 and now U.S. Pat. No. 5,713,605.

BACKGROUND OF THE INVENTION

The present invention relates generally to compact disc folders, and more particularly, to an improved, bindable compact disc folder that can be easily bound into a publication, such as a magazine as well as mailed separately.

Audio compact discs have become extremely popular with consumers over the past years and their use by consumers in the recorded music industry has surpassed that of prerecorded cassettes. Optically-readable compact discs are also rising in use and popularity in the computer software industry as the preferred medium for computer programs and data. Both audio and optical compact discs (the latter being known in the industry as "CD-ROMS") are usually sold or distributed to consumers in the form of hinged plastic boxes known in the trade as "jewel cases". These plastic boxes hold the disc in place as well as printed information about the disc. These jewel cases are cumbersome, easily prone to breakage and expensive to manufacture.

In the computer arts, many major computer-related magazines such as BYTE, PCWORLD and others, supply CD-ROMS to their subscribers with certain magazine issues. In these issues, the CD-ROM is separately packaged, laid on top of the magazine and then the two items are bundled together in a plastic bag that encloses both the CD-ROM and the magazine. This type of packaging is expensive and in rough handling that ay occur in delivery of mail, the CD-ROM may break through the outer plastic bag and become lost.

Other magazines publish indexes and special editions on CD-ROM and distribute them by holding the CD-ROM within a large, rigid cardboard folder. These cardboard folders approximate the size and thickness of the magazine and thus are bulky and necessitate a separate mailing from the magazine.

The present invention is directed to a compact disc folder that overcomes the aforementioned disadvantages and has a structure that permits it to easily and inexpensively be bound into a magazine as an insert, thereby eliminating the cost of enclosing the magazine and compact disc together with an exterior package to hold the compact disc in place.

SUMMARY OF THE INVENTION

In one principal aspect, the present invention includes a compact disc folder formed from a web of durable paperboard in which the web is folded along a foldline that divides the web into two opposing panels. One of the panels serves a rear panel for the folder while the other panel serves as a cover, or front panel, that overlies the rear panel. A compact disc that has been protectively wrapped to provide a disc assembly is applied to the rear panel within the folder by way of a releasable adhesive. The cover panel includes a die-cut opening aligned with the compact disc to display it and the cover panel is adhered to the rear panel along the marginal edges of the two panels by a permanent adhesive. The folder has a line of weakening applied to it along one side thereof to define a perforated binding strip extending along the marginal edge of the holder. This binding strip is registered with and inserted between signatures of a publication so that the holder may be readily and easily bound into a publication without the need for specialized insert and binding machinery.

In another principal aspect of the present invention, the rear panel of the folder has one or more lines of weakening applied thereto in registration with the compact disc to provide a tearable access flap that extends at least partially around the compact disc and to which the compact disc assembly is attached. The folder is further durable enough to serve as an independent mailer for the compact disc.

In a third principal aspect of the present invention, the compact disc folder is formed from an elongated paper web in the form of a multi-page signature. The web has a width sufficiently great to provide multiple pages of the resulting folder so that instructional or installation information, or even advertising, may be printed on the signature. The web is folded upon itself, one or more times, and glued in selected areas to form a booklet with two pages thereof adhered together to form a disc-receiving pocket. The compact disc assembly is applied to one of the two pages and the other page is applied thereover to enclose the compact disc assembly. The pages of the booklet are folded around a common foldline to define a common binding edge.

In another principal aspect of the present invention, one of the exposed pages of the signature booklet that overlies the compact disc assembly is perforated to form an access flap to the disc-receiving pocket to thereby permit a user to easily open the disc-receiving pocket and gain access to the compact disc, without damaging the remainder of the pages of the booklet.

Accordingly, it is a general object of the present invention to provide an improved folder for a compact disc that is bindable into a publication.

Another object of the present invention is to provide a bindable insert folder for a compact disc having opposing, overlying first and second panels that share a common foldline, the panels including a common line of weakening disposed along and spaced apart from a lengthwise marginal edge of the insert folder and the common foldline, the line of weakening defining a combined binding and tear strip of the insert holder.

A further object of the present invention is to provide a folder for a compact disc having two opposing front and rear panels sharing a common foldline, the folder having a compact disc adhered to a central portion of the rear panel and a die-cut opening formed in the front panel in registration with the front panel, the opening exposing to view, a portion of one surface of the compact disc, the front and rear panels being joined together to define an envelope that encloses the compact disc therebetween. The rear panel has one or more lines of weakening aligned with the compact disc that define a tearable access flap on the rear panel so that access may be had to the compact disc from exterior of the folder.

Still another object of the present invention is to provide a bindable folder for a compact disc in the form of a premade signature booklet in which two adjoining pages of the signature are adhered together to form a compact disc-receiving pocket that encloses a compact disc assembly, the signature booklet having a hard insert edge that permits the signature booklet to be easily bound into a magazine or other publication without separating any of the pages thereof.

Yet another object of the present invention is to provide a multi-page booklet, two pages of which cooperate to define an enclosure that secures a compact disc assembly in place within the booklet, the enclosure being surrounded on both sides thereof by additional pages of the booklet, the booklet being formed from a signature by folding and adhering page sections thereof onto each other to define a multi-page signature bindable into a publication.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which:

FIG. 1 is a perspective view of a compact disc folder constructed in accordance with the principles of the present invention inserted in place within a magazine;

FIG. 2 is an exploded perspective view of the magazine and insert folder of FIG. 1 schematically showing the binding of the insert holder into the magazine;

FIG. 3 is a plan view of the compact disc insert holder of FIG. 1 in an assembled state;

FIG. 4 is a plan view of a web from which the insert older of FIG. 3 is formed shown in an opened state;

FIG. 5 is a perspective view of a compact disc carrier assembly used in the compact disc insert folder of FIG. 3;

FIG. 6 is a perspective view of a portion of an assembly line used in constructing the compact disc insert holders of the present invention showing the application of the compact disc carrier assembly to the web;

FIG. 7 is a perspective view of the compact disc insert folder of FIG. 1 after detachment from the magazine showing how access is gained to the compact disc through the access flap;

FIG. 12 is a plan view of the signature of FIG. 10, illustrating the final folding and gluing of the right-hand page section;

FIG. 13 is a plan view of the folded signature of FIG. 12;

FIG. 14 is a plan view of the folded signature of FIG. 12, illustrating the initial folding of the left-hand page section;

FIG. 15 is a plan view of the signature of FIG. 14, illustrating the final folding and gluing of the left-hand page section;

FIG. 16 is a plan view of the folded, open signature of FIG. 15, illustrating the compact disc assembly glue applied to the signature in opposition to a perforated access flap;

FIG. 17 is a plan view of the signature of FIG. 16, illustrating a compact disc assembly applied to the left exposed page and a pattern of permanent glue applied thereto;

FIG. 18 is a plan view of the signature of FIG. 17, illustrating folding over the right-hand exposed page of the booklet onto the left-hand exposed page to form the final booklet; and, FIG. 19 is a plan view of the completed signature of FIG. 18 illustrating the perforated soft end edge of the booklet that frees the pages to open.

DETAILED DESCRIPTION OF THE INVENTION

Figure 8:
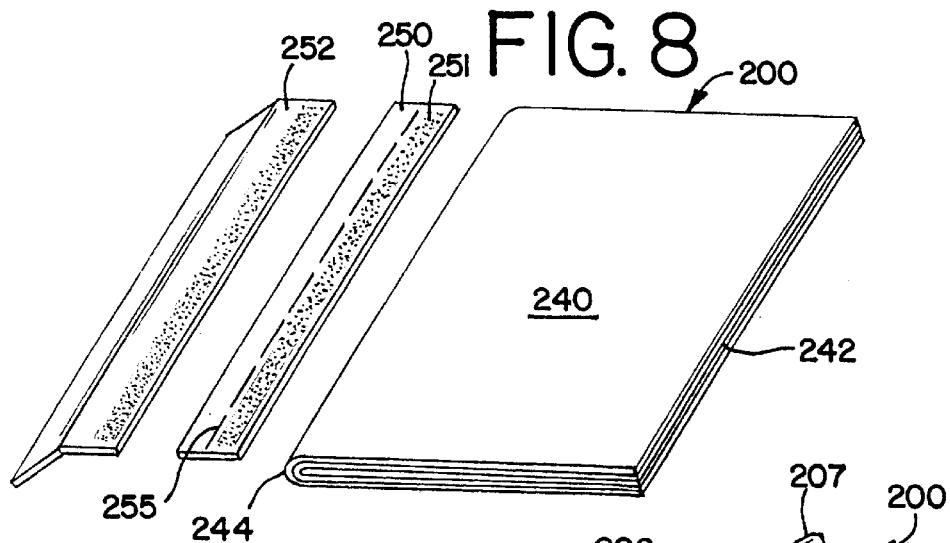
FIG. 8 is a perspective view of a second embodiment of a bindable compact disc folder in the form of a multi-page booklet constructed in accordance with the principles of the present invention.
Figure 9:
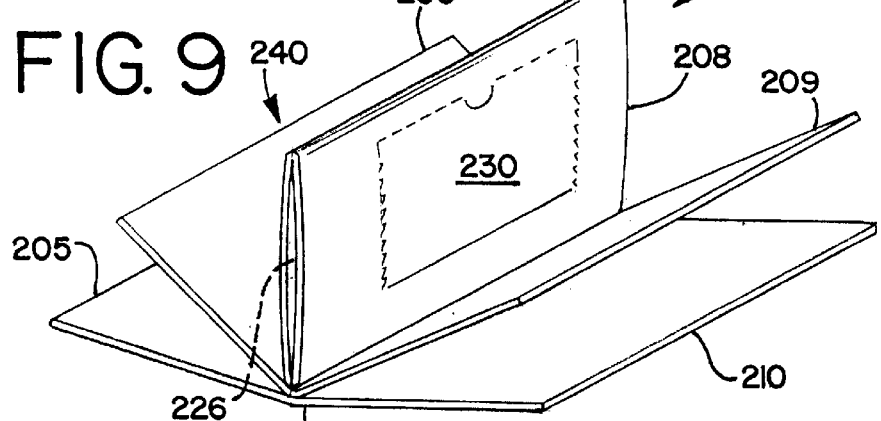
FIG. 9 is a perspective view of the folder booklet displaying the pages thereof in an open configuration.

FIG. 1 illustrates a publication, illustrated as a magazine 10, into which is bound a compact disc folder 50 constructed in accordance with the principles of the present invention. As seen in FIGS. 1 and 2, the magazine 10 is formed from a plurality of individual signatures or sections 12, that are assembled together so that they have opposing spine and page edges 14, 16. The signatures 12 are aligned together along their spine edges 14 and end portions 17 thereof are milled off, generally along a sectional line A—A shown in FIG. 2. The resultant milled spine ends then cooperatively form a single spine 18 of the magazine 10. The milled spine ends are roughened and a hot melt adhesive is then applied to the roughened spine 18 represented generally by "G" in FIG. 2. A magazine cover 20 is then applied to the collective spine 18 and is folded over the signatures 12 and clamped in place until the adhesive sets.

The folder 50 of the present invention, as explained in detail below, provides a flat folder in which a compact disc 52 is held securely in place between adjoining signatures 12. The folder 50 is formed from a single blank, or web 54, of a durable paper, such as a cardstock. The rigidity of the folder 50 permits it to be fed into registration with the signatures 12 by means of a shuttle feeder without fear of the compact disc 52 coming loose within the folder 50 or moving in a manner to upset the placement of the folder 50.

Turning now to FIG. 3, the folder 50 is seen to have a generally rectangular configuration. The blank 54 includes a central foldline 56 that divides the blank 54 into two planar sections, or panels 58, 60. One of the panels 60 forms a rear panel of the folder 50 that serves as a support for a compact disc assembly 80 and the other panel 58 defines a front panel of the folder 50 that serves as a cover for the folder 50 and the enclosed disc assembly 80. The two panels 58, 60, are folded about the dividing foldline 56 so that the front cover panel 58 overlies the rear base panel 60.

When the two panels 58, 60 are folded onto each other in that fashion, as shown in FIG. 4, the resulting folder 50 will include two opposing top and bottom edges 62, 64 that are interconnected together by two opposing side edges 66, 68. The left side edge 66 is the binding edge of the folder 50 that is aligned with the spines 14 of the signatures 12 when the folder 50 is inserted into the magazine during the binding process. The left side edge 66 is a "hard" edge, that is, it coincides with the center foldline 56 of the folder 50 rather than constitute two separate panels that may be separated at a "soft" edge. Thus, folders 50 of the present invention may be inserted into magazines and other publications with a conventional gripper mechanism, shown in phantom in FIG. 2 as a gripping wheel 22. The end of the side edge 66 of the folder 50 is also slightly milled when the signatures 12 are milled. The side edge 66 has glue applied thereto during the binding process.

As explained below, during the assembly process, the folder 50 has a line of weakening 70 formed by perforations disposed in the folder 50 that is spaced apart a predetermined distance W (FIG. 3) from the folder side edge 66. This line of weakening 70 in the completed folder 50 is formed by perforating the two folder panels 58, 60 in a single step in a location near the left, or inner side edge 66, of the folder 50 so that were the folder 50 to be unfolded as shown in FIG. 4, the perforations 70 will lie on opposite sides of the center foldline 56.

This line of weakening 70 is important to the present invention inasmuch as it defines on one side thereof, a marginal tear strip 72 of width W that is bound into the magazine 10 between the signatures 12 and, on the other side thereof, a body portion 69 of the folder 50. The tear strip 72 is bound into the magazine 10 and its line of weakening 70 extends out from the spine 18 of the magazine 10 as shown in FIG. 1. This permits a purchaser of the magazine to easily tear the folder body portion 69 away from the tear strip 72 that is bound into the magazine 10.

The folder 50 contains a compact disc assembly 80 that includes a planar paperboard base portion 82, a compact disc 52 supported on one surface 83 of the base portion 82 and an outerwrap, or covering 84, formed from a pliable, and preferably transparent material such as a plastic film. The film may be polyethylene, polypropylene, polyvinyl chloride or any other suitable drawn or laminated flexible plastic. The compact disc 52 may be conveniently shrink-wrapped with this flexible packaging media in place on the base portion 82 by the covering 84 so that the packaging media entirely encompasses the compact disc 52 and the base portion. The base portion 82 preferably has dimensions that give it an area that is larger than the compact disc 52 so that it may accommodate the compact disc 52 well within the perimeter 86 of the base portion 82 in order to reduce the likelihood of interference with the outer edges 53 of the compact disc 52 with a disc assembly placement apparatus 100, illustrated in FIG. 6.

Once assembled, the compact disc assembly 80 is applied to the interior surface 61 of the rear panel and held thereon by way of a releasable adhesive 88 deposited thereon in a suitable predetermined pattern, shown as multiple lines forming a square 89, although the adhesive 88 may be arranged in any pattern of sufficient area to reliably retain the disc assembly 80 in place. The releasable adhesive 88 is preferably deposited on the rear panel interior surface 61 in registration with an access flap 90 that is formed in the rear panel 60 of the folder 50.

Two or more lines of a permanent adhesive 74 may be applied to either one or both of the panels of the folder 50, illustrated in FIG. 4 as the interior of the rear panel 60. The adhesive 74 is applied near the top and bottom side edges 62, 64 and the right side edge 68 of the folder 50. Although illustrated in FIG. 4 as evenly spaced lines of permanent adhesive 74 near the edges of the folder 50, it will be understood that the permanent adhesive may be applied in a random pattern. It is preferred that the permanent adhesive 74 be applied at least near the right side edge 68 of the folder to prevent an unauthorized user from accessing the compact disc 52 while the folder is in a publication 10.

When the cover panel 58 is folded onto the rear panel 60 and into contact with the permanent adhesive 74 to, in effect, form an interior disc-receiving pocket 76 (FIG. 7) that contains the disc assembly 80. The rear panel 60 includes an access flap foldline 94 formed therein extends generally parallel to the web center foldline 56 and the line of weakening 70. Two lines of rough perforations 92 extend from the access flap foldline 94 to define the sides of the access flap. A third set of perforations 93, preferably finer than the first set of perforations 92, interconnects the rough perforations 92 to define the access end 96 of the access flap 90 that is separable from the second panel 60.

Midway through these perforations 93, a semicircular finger tab 97 may be formed from either the fine perforations 93 or from a straight die-cut. This tab 97 may be raised by a user from the exterior surface 63 of the rear panel 60 to permit a user to slip a finger between the two panels 58, 60 at the access flap 90 in a manner so that the lines of perforations 92, 93 break to free the access flap 90, thereby exposing the disc assembly 80 to the user.

The user may then easily detach the disc assembly 80 and open its covering 84 to free the disc 52 from the insert folder 50 in the manner shown in FIG. 7. The front panel 58 of the folder 50 may have a disc-viewing opening 73 formed thereon such as by die-cutting, punching or any other suitable process. This opening 73 permits a subscriber to view the disc compact 52 from exterior of the folder 50. In this regard, the opening 73 preferably has a diameter $D_o$ that is less than the diameter $D_d$ of the compact disc 52 so that the compact disc 52 will not work its way out of the folder 52 through the opening 73.

The present invention lends itself to reliable and simple automated manufacture utilizing an assembly line 99, or related, discrete assembly stations. As illustrated in FIG. 6, the blanks 54 may have their foldlines 56 formed thereon such as at an embossing station 102 and die-cut at a cutting station 104 to provide the disc-viewing opening 72. The blank 54 is then further advanced to a disc assembly application station 106. In this application station 106, a supply of disc assemblies 80 are stacked in a vertical supply 108 supported above the blanks 54. Individual disc assemblies 80 are fed from the feed supply 108 in serial order by a feed mechanism 110 onto its designated location on the second panel 60 of the folder 50 in registration with the access flap 90.

A pattern of releasable adhesive is applied to the blanks 54 in a conventional fashion such as by a patterned roller 112, or a spray apparatus. The blanks 54 then each receive, in serial order, a single disc assembly 80 to form a blank-disc assembly 114 that is advanced to a pressing station 116. The pressing station 116 includes a pliable roller 118 with a press pad 119 that impinges upon the compact disc assembly 80 to press it into intimate contact with the blank second panel 60.

A permanent adhesive 74 that adheres the first and second panels 58, 60 of the folder together is applied at a gluing station 120 such as by an application roller 122 prior to folding one of the two panels onto the other at a folding station 124 to form the folder 50 and its interior disc-receiving pocket 76. After folding, the line of weakening 70 may then be formed along the edge 66 of the folder 50 by a suitable perforating mechanism known in the art, or it may be applied at any time prior thereto.

It will be understood that some of the steps or production, such as embossing and die-cutting, and even perforating may be done at remote stations and the present, embossed blanks may be then held in a supply and fed serially to the disc assembly application station.

FIGS. 8–19 illustrate a second embodiment of a bindable disc folder 200 constructed in accordance with the principles of the present invention. The general structure of this folder 200 is much the same as the folder 50 of the first embodiment and both embodiments, as illustrated in FIGS. 3 & 8, share a leftmost "hard" binding edge for insertion into a magazine or other publication. The folder 200 of the second embodiment is advantageously integrally formed within a multi-page paper signature and the multiple pages permit the printing of additional information thereon.

The signature 202 begins as an elongated, continuous paper web 204 having a width w equivalent to the finished width of the publication 10 and a length L that accommodates a preselected number of pages, illustrated as six page sections 205, 206, 207, 208, 209 and 210. Such a web 204 will provide a signature with twelve base pages, taking into account the fact that each of the single page sections 205–210 has two available sides, or surfaces, for printing. Both the front surfaces (those facing out of the surface of the pages containing the drawing figures) and the rear surfaces (those facing into the surface of the pages containing the drawing figures) may have information, graphics, advertising information etc. printed thereon by conventional printing presses. Each of these page sections are folded in a known manner for signature assembly.

Figure 10:
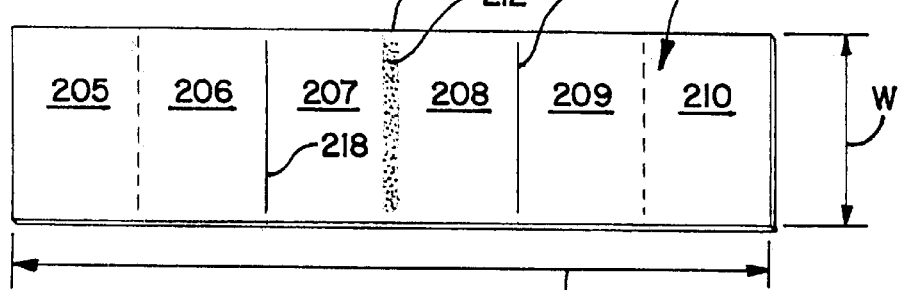
FIG. 10 is a plan view of a twelve-page signature used to form the booklet of FIG. 8.
Figure 11:
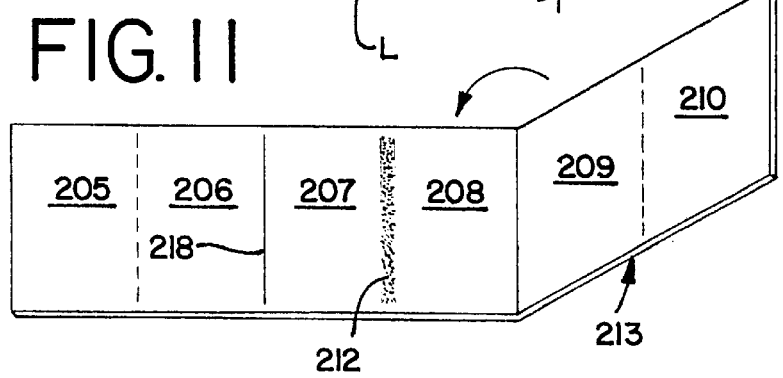
FIG. 11 is a plan view of the signature of FIG. 10 illustrating the initial folding of the right-hand page section.

Turning now to FIG. 10, a continuous web 204 is illustrated with an adhesive strip 212 applied to its upper surface 211, generally in the center of the web 204 so that it may hold one or more folds of the signature together. The rightmost two page sections 209, 210 are folded as a unit 213 around a first, rightmost foldline 214 so that the two-page section 209–210 will flank and adhere to the adhesive strip 212 as illustrated in FIG. 13. Another strip of adhesive 216 is then applied onto the reverse surface 217 of the two-page unit 213, and preferably in alignment with the first adhesive strip 212. The leftmost two page sections 205, 206 are folded as a unit 219 around a second, leftmost foldline 218 and onto the second adhesive strip 216, as illustrated in FIG. 15 to form an open signature assembly 220 with two exposed center pages 221A, 221B.

The two exposed, open signature assembly pages 221A, 221B are combined as explained in greater detail below to form a disc-receiving pocket 226 that entirely encloses a compact disc assembly 232. The disc-receiving pocket 226 securely holds the compact disc assembly 232 within the assembled signature in a manner that will resist the compact disc assembly 232 from piercing through the signature and in a manner that eliminates the need for enclosing the publication 10 with a protective, plastic covering as is used in the prior art.

The center of the open signature assembly 220 may be scored with a line of perforations 228 for ease of folding one side of the signature onto the other side prior to insertion into a publication. The compact disc assembly 232 is firmly retained within the signature (and in the publication into which it is inserted) and the signature takes the form of a multi-page booklet. It can be understood then that the folder 200 has an increased number of printable surfaces than the folder 50 of FIGS. 1–7 and these additional surfaces may be used for advertising, for software installation instructions, for game and program instructions. The resulting effect is that the compact disc is effectively integrated into an accompanying manual.

Returning now to the drawings, and with specific reference to FIG. 16, a pattern 222 of releasable adhesive is applied to one of the exposed pages of the open signature assembly 220, illustrated as the leftmost page 221A in FIG. 16, while the other exposed page 221B of the open signature assembly 220 is perforated by lines of perforations 228, in the manner explained for the first embodiment, to thereby define an access flap 230 thereon.

A compact disc assembly 232 of the type utilized in the first embodiment having a base portion, a compact disc 52 imposed thereon and an outer flexible covering encompassing both the disc and the base, is applied to the releasable adhesive 222 on the one exposed page 221A. Another pattern of a permanent adhesive 234 is applied to either of the two exposed pages 221A, 221B (shown as the one exposed page 221A in FIGS. 17 & 18), and one of the portions of the open signature assembly 220 is folded upon the other to entirely enclose the compact disc assembly 232 and form a secure, disc-receiving pocket 226 of the completed signature. Preferably, because of the difference in weights of the two portions of the open signature assembly 220, the portion not containing the compact disc assembly 232 is folded upon the other to form a completed signature booklet 240 which constitutes the folder 200. The forming of the disc-receiving pocket 226 results in the loss of two pages of the completed signature booklet 240 for printing information thereon so that in the embodiment illustrated, there are only ten pages available for printing of the twelve-page web 204. The total available pages for printing in any signature used to form the folders 200 of the invention may be found from the formula N–2, where N is the number of pages in the initial signature web.

In order to facilitate this folding and in consideration of the adhesives 212, 216 used to assemble the open signature assembly 220, a center scoreline formed by perforations 238 is made between the two portions of the open signature assembly 220 so that the two sections will, in effect, break upon plow folding. The use of such a perforated line 238 is optional dependent upon the type and weight of paper used and the adhesive. Once folded and applied together, one marginal edge 242 of the signature booklet 240 is slit to define a bursting, or tear strip 243 and create an open edge 245 coincident with the marginal edge 242 of the booklet 240. The strip 243 is removed or "burst" to expose the page sections 205–210 of the folder 200. The open edge 245 and the hard edge 244 permits the signature booklet 240 to be opened in a customary manner.

This embodiment is advantageous in that it permits the compact disc assembly 232 to be packaged inside of a web 204 during production of the signature that is easy to transfer and handle in printing, insertion and binding machinery. A web press is automated and thus, the folders 200 of the present invention may be completed in a more efficient manner than other prior art articles. The two embodiments may also be used as a direct mailer for the compact disc 52 with address information being printed on the rear panel of the folder 50 and on the front or rear pages of the signature booklet 240.

In inserting the folder 200 into a publication, it may be transferred into place with other signatures and glued in place as illustrated in FIG. 2, or it may include, as illustrated in FIG. 8, a separate binding strip 250, known in the art as a Magna-craft strip, of a preselected width that is glued with an adhesive 251 to the signature booklet near its hard edge 244 for binding. Such a strip may include a perforated line 255 as shown. A binding hanger strip 252 may also be used in its place for use in publications that are saddle-stitched.

While the preferred embodiment of the invention have been shown and described, it will be apparent to those skilled in the art that changes and modifications may be made therein without departing from the spirit of the invention, the scope of which is defined by the appended claims.

We claim:

1. An insert folder containing a compact disc for binding into a publication, comprising: a web folded upon itself around a central foldline to define a four-sided disc folder, the foldline separating the web into first and second panels of substantially equal size, the disc-folder having top and bottom edges interconnected by two generally parallel side edges, the first and second panels being joined together in overlying relationship by first adhesive means disposed between said first and second panels along at least two of said four sides of said disc folder, said foldline and said first adhesive means cooperating to define an interior compact disc-receiving pocket between said first and second panels, the insert folder further including a prepackaged compact disc assembly, the compact disc assembly including a base, a compact disc disposed upon said base and a protective packaging media encompassing said base sheet and said compact disc thereupon, said compact disc assembly being positioned in a predetermined location on said second panel within said disc-receiving pocket and spaced apart from said four edges of said disc folder and held in place thereon by second adhesive means, said foldline further defining a bindable edge of said insert folder for binding into a publication without said first and second panels coming apart.

2. The compact disc insert folder as defined in claim 1, further including a line of weakening formed in said first and second panels and extending along one of said insert folder side edges and spaced apart from said foldline to define a marginal binding strip at said one side edge, said marginal binding strip having a width sufficiently large for binding said insert folder into a publication while exposing said lines of weakening to a user, said insert folder being separable from said marginal binding strip along said lines of weakening.

3. The compact disc insert folder as defined in claim 1, wherein said compact disc assembly packaging media is a shrink-wrap plastic.

4. The compact disc insert folder as defined in claim 1, wherein said web is formed from a cardstock and said first adhesive means is a permanent adhesive.

5. The compact disc insert folder as defined in claim 1, wherein said second adhesive means is a releasable adhesive.

6. The compact disc insert folder as defined in claim 1, wherein first panel includes a circular opening disposed therein between said four sides of said disc holder and in registration with said compact disc assembly to display a portion of said compact disc through said first panel.

7. The compact disc insert folder as defined in claim 1, wherein said web is formed from an elongated sheet of paper, the paper sheet including at least two additional folder panels defined thereon integrally attached to said first and second panels, said two additional panels underlying said first and second panels, said first and second panels of said insert folder being disposed in the center of said additional panels.

8. The compact disc insert folder as defined in claim 1, wherein said second panel includes a compact disc assembly access flap formed in said second panel by lines of weakening aligned with said compact disc assembly.

9. The compact disc insert folder as defined in claim 1, wherein said second panel includes a tearable access flap for gaining access to said compact disc, said access flap being defined by at least first and second distinct lines of perforations and extending through said second panel and aligned with said compact disc assembly such that said access flap is partially separable from said second panel, said perforations of said second line of perforations being finer than said perforations of said first line of perforations, said second panel further including a second foldline spaced apart from said second line of perforations to define a hinge point around which said access flap rotates, said second adhesive means being disposed on an interior surface of said access flap and retaining said compact disc assembly on said second panel at least partially upon said access flap.

10. A folder for enclosing a compact disc and suitable for binding into a magazine, comprising:

a single blank folded upon itself along a first foldline to provide two distinct panels hingedly interconnected to one another, a first of said two panels being folded upon and connected to a second of said two panels, a hard binding edge of the folder being formed by and coincident with the first foldline, a soft side edge of the folder being formed by two aligned, common edges of said two panels and spaced apart from said folder hard binding edge, said first and second panels being connected together by a permanent adhesive along at least said folder soft side edge to define a sealed folder with a disc-receiving pocket therebetween;

a compact disc assembly held within said disc-receiving pocket between said first and second panels, the compact disc assembly including a planar base member, a compact disc supported on the base member and held thereon by an outer protective coating that completely envelops the compact disc upon said base member, said compact disc assembly being connected to said second panel by a releasable adhesive disposed in a predetermined orientation on said folder, said first panel having an opening formed therein in registration with said compact disc that permits a substantial portion of said compact disc to be viewed from outside said folder;

and, a first line of perforations extending through said first and second panels proximate to said first foldline that forms said folder hard binding edge, said first perforated line defining, on one side of said first perforated line, a binding strip of said folder near said folder hard edge, the first line of perforations defining on one side thereof, a body portion of said folder, and on the other side thereof, said binding strip, the body portion of said folder being manually separable from said binding strip.

11. The compact disc folder of claim 10, wherein said folder includes a flap defined in said second panel, the flap permitting access to said compact disc assembly from exterior said folder, said folder including second and third lines of perforations disposed in said second panel which define said flap and further including a second foldline disposed in said second panel in said body portion of said folder and generally parallel to said folder hard edge, the second foldline interconnecting said second lines of perforations to define an axis about which said flap may be moved with respect to said second panel.

12. The compact disc folder of claim 10, wherein said folder first and second panels are connected along a fourth edge extending between said first and second edges.

13. A folder for distributing a compact disc, comprising: a single web of cardstock folded upon itself along a first foldline to provide distinct first and second panels hingedly interconnected to each other, the first panel being folded upon the second panel and glued thereto define a folder pocket; a compact disc assembly held within the folder pocket, the compact disc assembly including a support, a compact disc disposed on one side of said support, a protective covering applied to both the compact disc and said support, and entirely enclosing said compact disc and support, said compact disc assembly being glued to said second panel to retain it entirely within said folder pocket; a tearable flap formed in said second panel for gaining access to folder pocket for removal of said compact disc assembly therefrom; the flap having four sides, one of said flap four sides being defined by a second foldline formed in said second panel and spaced apart from said folder first foldline and the remainder of said flap four sides being defined by at least two lines of perforations; and, a line of weakening spaced apart from said foldline and extending through said first and second panels so as to define on one side of said line of weakening, a marginal tear strip having a width sufficiently great for binding into a spine portion of a publication, and a body portion of said folder on the other side of said line of weakening, the folder body portion enclosing said compact disc assembly and being separable from said tear strip.

14. A folder for containing a compact disc, comprising: first and second panels of substantially equal size, the folder having top and bottom edges interconnected by two generally parallel side edges, the first and second panels being joined together in overlying relationship at least by first adhesive means disposed between said first and second panels along at least two of said four edges of said folder, said first adhesive means at least partially defining an interior compact disc-receiving pocket between said first and second panels, the insert folder further including a compact disc assembly, the compact disc assembly including a compact disc enclosed within a protective packaging media, and said compact disc assembly being positioned in a predetermined location on said second panel within said disc-receiving pocket and spaced apart from said top and bottom edges of said folder, one of said four edges of said folder further defining a bindable edge of said folder for binding into a publication without said first and second panels coming apart.

15. The compact disc folder as defined in claim 14, wherein said first and second panels are defined on a web folded upon itself.

16. The compact disc folder as defined in claim 14, further including a line of weakening spaced apart from and extending along one of said two side edges, the line of weakening defining a marginal binding strip having a width sufficiently large for bending said folder into a publication while exposing said line of weakening to a user, said folder being separable from said marginal binding strip along said line of weakening.

17. The compact disc folder as defined in claim 14, wherein one of said first and second panels includes at least two lines of weakening therein that cooperatively define an access flap by which a user may gain access to said compact disc assembly.

18. The compact disc folder as defined in claim 17, wherein the other of said first and second panels includes an opening formed therein that exposes a portion of said compact disc to view.

* * * * *